United States Patent
Jo et al.

(10) Patent No.: US 12,341,179 B2
(45) Date of Patent: *Jun. 24, 2025

(54) FABRICATION METHOD OF POSITIVE ELECTRODE FOR SECONDARY BATTERY AND SECONDARY BATTERY INCLUDING THE POSITIVE ELECTRODE

(71) Applicant: SK ON CO., LTD., Seoul (KR)

(72) Inventors: Byoung Wook Jo, Daejeon (KR); Byung Chan Kang, Daejeon (KR); Yong Hee Kang, Daejeon (KR); Sung Jun Park, Daejeon (KR); Hyo Sung Lim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 182 days.

This patent is subject to a terminal disclaimer.

(21) Appl. No.: 17/395,141

(22) Filed: Aug. 5, 2021

(65) Prior Publication Data
US 2022/0045308 A1 Feb. 10, 2022

(30) Foreign Application Priority Data
Aug. 5, 2020 (KR) .................. 10-2020-0097885

(51) Int. Cl.
*H01M 4/04* (2006.01)
*H01M 4/02* (2006.01)
(Continued)

(52) U.S. Cl.
CPC ......... *H01M 4/0404* (2013.01); *H01M 4/505* (2013.01); *H01M 4/525* (2013.01); *H01M 4/622* (2013.01); *H01M 2004/028* (2013.01)

(58) Field of Classification Search
CPC .... H01M 4/0404; H01M 4/505; H01M 4/525; H01M 4/622; H01M 2004/028; H01M 4/0471; H01M 4/139
See application file for complete search history.

(56) References Cited

U.S. PATENT DOCUMENTS

2016/0172675 A1* 6/2016 Ito et al. ............... H01M 4/366
  429/223
2018/0337393 A1* 11/2018 Jeong et al. ........ H01M 4/0404

FOREIGN PATENT DOCUMENTS

CN 104692352 A 6/2015
CN 106299269 A 1/2017
(Continued)

OTHER PUBLICATIONS

Matsumoto et al., JP 2013134913 A English Translation, Jul. 8, 2013.*

(Continued)

*Primary Examiner* — Matthew T Martin
*Assistant Examiner* — Alexandra J Simmons
(74) *Attorney, Agent, or Firm* — IP & T GROUP LLP

(57) ABSTRACT

The present invention provides a fabrication method of a positive electrode for a secondary battery, including: (a) heating a slurry composition for a positive electrode containing a positive electrode active material, a binder, and a solvent to a temperature lower than a boiling point ($T_b$) of the solvent; (b) applying the heated slurry composition for a positive electrode onto a current collector; and (c) cooling the applied slurry composition for a positive electrode.

7 Claims, 2 Drawing Sheets

(51) Int. Cl.
*H01M 4/505* (2010.01)
*H01M 4/525* (2010.01)
*H01M 4/62* (2006.01)

(56) References Cited

FOREIGN PATENT DOCUMENTS

| | | | | |
|---|---|---|---|---|
| CN | 107611338 A | | 1/2018 | |
| JP | 2013134913 A | * | 7/2013 | ............. Y02E 60/10 |
| JP | 2016-085964 A | | 5/2016 | |

OTHER PUBLICATIONS

Extended European Search Report for the European Patent Application No. 21189192.4 issued by the European Patent Office on Dec. 3, 2021.

Office Action for Japanese Patent Application No. 2021-128649 issued by the Japanese Patent Office on Apr. 22, 2025.

* cited by examiner

FABRICATION METHOD OF POSITIVE ELECTRODE FOR SECONDARY BATTERY AND SECONDARY BATTERY INCLUDING THE POSITIVE ELECTRODE

CROSS-REFERENCE TO RELATED APPLICATIONS

This application claims priority under 35 U.S.C. § 119 to Korean Patent Application No. 10-2020-0097885, filed on Aug. 5, 2020, in the Korean Intellectual Property Office, the disclosure of which is incorporated herein by reference in its entirety.

TECHNICAL FIELD

The following disclosure relates to a fabrication method of a positive electrode for a secondary battery and a secondary battery including the positive electrode.

BACKGROUND

Recently, in accordance with an increase in a demand for electronic devices such as mobile devices, the development of technologies for weight reduction and miniaturization of electrochemical batteries (secondary batteries) for increasing portability of the electronic devices has been expanded. In addition to such a trend, in accordance with a global trend toward tightening regulations on fuel efficiency and exhaust gas of automobiles, the growth of an electric vehicle (EV) market has been accelerated, such that the development of high-output and large-capacity batteries to be used in such electric vehicles has been demanded.

In such an electrochemical battery (secondary battery), generally, an electrode for the secondary battery is fabricated by applying an electrode slurry prepared by mixing an electrode active material, a conductive material, and a binder with each other in a solvent and dispersing the mixed electrode active material, conductive material, and binder using a strong shear force onto a current collector and then drying the electrode slurry. In this case, when a solvent used to dissolve the binder while dispersing the electrode active material and the conductive material remains after a drying process, the solvent causes an electrochemical side reaction in the secondary battery to adversely affect performance of the secondary battery. Meanwhile, a solvent flow from an inner portion of an electrode slurry layer to a surface of the electrode slurry layer occurs by a capillary force generated due to exposure of particles of the electrode active material or the like to a surface of the solvent in the drying process. As a result, the conductive material or the binder having a relatively smaller particle size than the electrode active material migrates, such that a large amount of conductive material or binder is distributed on a surface of the electrode. Such non-uniform distributions of the conductive material and the binder cause an increase in resistance of the secondary battery or a decrease in adhesive force between a substrate (current collector) and an electrode active material layer. Therefore, in order to solve the problems described above, a method of suppressing migration of small particles (the binder and the conductive material) in the electrode slurry while decreasing a content of the solvent remaining in the secondary battery by decreasing a content of the solvent in the electrode slurry to increase a viscosity of the electrode slurry has been studied. However, in a case where the content of the solvent in the electrode slurry is decreased to increase the viscosity of the electrode slurry, fluidity of the electrode slurry rapidly decreases, such that workability decreases, an electrode having a non-uniform thickness is fabricated, and an adhesive force between the current collector and the electrode active material layer in the electrode decreases. Therefore, research and development for solving a problem that an adhesive force of the substrate is decreased due to fluidity of a high-viscosity solvent while decreasing the content of the solvent are required.

SUMMARY

An object of the present invention is to solve a problem caused by migration of a conductive material and a binder due to a flow of a low-viscosity solvent at the time of drying a positive electrode slurry containing a positive electrode active material, the conductive material, the binder and a solvent, that is, a problem that an adhesive force between a current collector and a positive electrode active material layer is decreased, in a process of forming the positive electrode active material layer by applying the positive electrode slurry onto the current collector and drying the positive electrode slurry.

In one general aspect, a fabrication method of a positive electrode for a secondary battery includes: (a) heating a slurry composition for a positive electrode containing a positive electrode active material, a binder, and a solvent to a temperature lower than a boiling point ($T_b$) of the solvent; (b) applying the heated slurry composition for a positive electrode onto a current collector; and (c) cooling the applied slurry composition for a positive electrode.

A solid in the slurry composition for a positive electrode may be contained in an amount of more than 74 parts by weight and 90 parts by weight or less based on 100 parts by weight of the slurry composition for a positive electrode.

A viscosity ($A_1$) of the slurry composition for a positive electrode before being heated may be 13,000 to 80,000 cP.

A temperature (T) of the heating of the slurry composition for a positive electrode may satisfy the following Relational Equation 1:

$$0.3T_b < T < 0.9T_b \quad \text{[Relational Equation 1]}$$

wherein $T_b$ is the boiling point of the solvent.

The cooling may be performed at a temperature of 10 to 30° C. for 1 to 60 seconds.

The slurry composition for a positive electrode may satisfy the following Relational Equations 2 and 3:

$$1.3 \leq A_1/A_2 \leq 12 \quad \text{[Relational Equation 2]}$$

$$1.1 \leq A_3/A_2 \leq 10 \quad \text{[Relational Equation 3]}$$

wherein $A_1$ is a viscosity of the slurry composition for a positive electrode before being heated, $A_2$ is a viscosity of the heated slurry composition for a positive electrode, and $A_3$ is a viscosity of the cooled slurry composition for a positive electrode.

The fabrication method of a positive electrode for a secondary battery may further include (d) drying the cooled slurry composition for a positive electrode. The drying may be performed at a temperature of 110° C. or more and less than 145° C. for 20 to 150 seconds.

In another general aspect, a positive electrode for a secondary battery is fabricated by a fabrication method of a positive electrode for a secondary battery including: (a) heating a slurry composition for a positive electrode containing a positive electrode active material, a binder, and a solvent to a temperature lower than a boiling point ($T_b$) of the solvent; (b) applying the heated slurry composition for a positive electrode onto a current collector; and (c) cooling the applied slurry composition for a positive electrode, and includes: the current collector; and a positive electrode active material layer formed on the current collector and containing a positive electrode active material, a conductive material, and a binder.

An adhesive force of the positive electrode active material layer to the current collector may be 0.35 N/cm or more.

In the positive electrode, a difference between a maximum loading value and a minimum loading value of the positive electrode active material layer at five or more positions having regular intervals in a length direction may be 10% or less of a total loading average value.

In still another general aspect, a secondary battery includes: a positive electrode; a negative electrode; a separator positioned between the positive electrode and the negative electrode; and an electrolyte, wherein the positive electrode is fabricated by a fabrication method of a positive electrode for a secondary battery including: (a) heating a slurry composition for a positive electrode containing a positive electrode active material, a binder, and a solvent to a temperature lower than a boiling point ($T_b$) of the solvent; (b) applying the heated slurry composition for a positive electrode onto a current collector; and (c) cooling the applied slurry composition for a positive electrode, and the positive electrode includes: the current collector; and a positive electrode active material layer formed on the current collector and containing a positive electrode active material, a conductive material, and a binder.

DETAILED DESCRIPTION OF EMBODIMENTS

Figure 1:
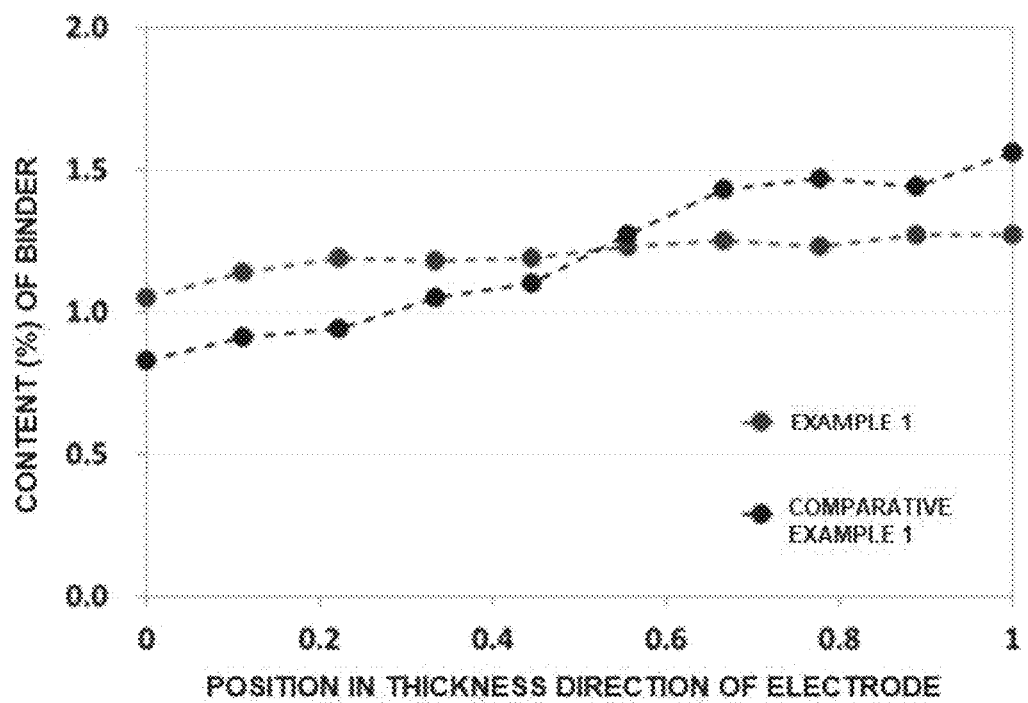
FIG. 1 is graphs illustrating results of distributions of binders in positive electrode active material layers according to a thickness direction through results obtained by analyzing cross sections of positive electrodes according to Example 1 and Comparative Example 1 by a scanning electron microscope-energy dispersive X-ray spectroscopy (SEM-EDS).

Various advantages and features of the present invention and methods accomplishing them will become apparent from the following detailed description of embodiments with reference to the accompanying drawings. However, the present invention is not limited to embodiments to be described below, but may be implemented in various different forms, these embodiments will be provided only in order to make the present invention complete and allow those skilled in the art to completely recognize the scope of the present invention, and the present invention will be defined by the scope of the claims. Hereinafter, detailed contents for carrying out the present invention will be described in detail with reference to the accompanying drawings. Throughout the drawings, the same reference numbers denote the same components, and "and/or" includes each and all of one or more combinations of the mentioned items.

Unless defined otherwise, all terms (including technical and scientific terms) used in the present specification have the same meaning as meanings commonly understood by those skilled in the art to which the present invention pertains. Throughout the present specification, unless described to the contrary, "including" any component will be understood to imply the inclusion of other elements rather than the exclusion of other elements. In addition, a singular form includes a plural form unless specially described in the text.

In the present specification, when an element such as a layer, a film, a region, or a plate is referred to as being "on" another element, it may be directly on another element or may be on another element with the other element interposed therebetween.

In the present specification, a "viscosity" is a value measured at a shear rate of 5 s$^{-1}$ using a Brookfield rotary viscometer at a corresponding slurry temperature of each process, and has a tolerance of ±5 cP.

An embodiment of the present invention provides a fabrication method of a positive electrode for a secondary battery, including: (a) heating a slurry composition for a positive electrode containing a positive electrode active material, a binder, and a solvent to a temperature lower than a boiling point ($T_b$) of the solvent; (b) applying the heated slurry composition for a positive electrode onto a current collector; and (c) cooling the applied slurry composition for a positive electrode.

First, the slurry composition for a positive electrode containing the positive electrode active material, the binder, a conductive material, and the solvent is prepared.

A solid (a positive electrode active material, a binder, and a conductive material) in the slurry composition for a positive electrode may be contained in an amount of more than 74 parts by weight, specifically more than 74 parts by weight and 90 parts by weight or less, and more specifically more than 74 parts by weight and 85 parts by weight or less, based on 100 parts by weight of the slurry composition for a positive electrode.

In general, in a fabrication process of the positive electrode for a secondary battery, a slurry should have a viscosity of about 1,000 cp to 10,000 cp at 25° C. in order to facilitate a slurry applying work and fabricate the positive electrode having a uniform thickness. However, in a case where the slurry composition for a positive electrode is prepared so that a content of the solid in the slurry composition for a positive electrode is 80 wt % (parts by weight) or more by decreasing a content of the solvent in the slurry composition for a positive electrode by a conventional method, a viscosity of the slurry becomes 53,000 cP or more, such that fluidity of the slurry decreases rapidly, resulting in lower workability, the positive electrode having a non-uniform thickness is fabricated, and an adhesive force between the current collector and a positive electrode active material layer in the positive electrode decreases. Therefore, the conventional slurry composition for a positive electrode contains a solid of about 74 wt, (parts by weight).

On the other hand, in the present invention, a fluidity problem may be solved by heating a high-viscosity slurry for a positive electrode. However, in a case where the solid exceeds the above-mentioned weight range, when the slurry composition for a positive electrode is prepared, the slurry composition does not contain a minimum solvent required for dispersing solid particles, such that a shear force for dispersing the solid particles is not sufficiently at work, and the solid particles in the slurry composition may thus be applied onto the current collector in a state in which they are non-uniformly dispersed, and in a case where the solid is less than the above-mentioned weight range, fluidity of the slurry composition is sufficient, such that there is no need to apply a technology proposed in the present invention.

A viscosity ($A_1$) of the slurry composition for a positive electrode before being heated may be 13,000 to 80,000 cP, preferably 15,000 to 75,000 cP, 20,000 to 75,000 cP, or 25,000 to 75,000 cP, and more preferably 35,000 to 70,000 cP, 45,000 to 70,000 cP, 50,000 to 70,000 cP, or 55,000 to 70,000 cP, at 25° C.

In a case where the viscosity ($A_1$) of the slurry composition for a positive electrode is less than 13,000 cP at 25° C. due to an increase in the content the solvent in the slurry composition for a positive electrode, an amount of the solvent contained in the slurry composition is large, such that an adhesion force between the positive electrode active material layer and the current collector is weakened due to a binder migration phenomenon, and long-term stability may thus be decreased.

In a case where the viscosity ($A_1$) of the slurry composition for a positive electrode exceeds 80,000 cP at 25° C., even though the content of the solid (particularly, the positive electrode active material and the binder) increases, an increase in the adhesive force between the positive electrode active material layer and the current collector is insignificant.

In addition, as described below, the slurry composition for a positive electrode is applied onto the current collector in a state in which a viscosity of the slurry composition for a positive electrode is decreased by heating the slurry composition for a positive electrode, such that the binder in an applied film (applied slurry composition for a positive electrode) does not migrate to a surface of an electrode. Therefore, even though the slurry composition for a positive electrode contains the binder in a small amount, the slurry composition for a positive electrode may have an excellent adhesive force to a substrate (current collector). As a result, the slurry composition for a positive electrode may contain the binder in a smaller amount than a conventional slurry composition for a positive electrode. Therefore, the slurry composition for a positive electrode may contain the positive electrode active material in a larger amount than the conventional slurry composition for a positive electrode to provide a positive electrode having an improved electrode capacity.

Specifically, a weight ratio (content ratio) of the positive electrode active material: the binder in the solid may be 1:0.01 to 0.1, specifically 1:0.01 to 0.05, and more specifically 1:0.01 to 0.03.

The positive electrode active material may be used without limitation as long as it is a positive electrode active material usually used for the secondary battery. As an example, the positive electrode active material may be a composite oxide of a metal selected from cobalt, manganese, nickel, and combinations thereof and lithium, but is not limited thereto.

The binder is not particularly limited as long as it is a conventional binder capable of serving to bind the positive electrode active material to the current collector well while binding positive electrode active material particles to each other well. As an example, the binder may be polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, or the like, but is not limited thereto.

The solvent may be at least one selected from the group consisting of an amine-based solvent such as N,N-dimethylaminopropylamine and diethylenetriamine; an ether-based solvent such as ethylene oxide and tetrahydrofuran; a ketone-based solvent such as methyl ethyl ketone; an ester-based solvent such as methyl acetate; and a polar aprotic solvent such as dimethylacetamide and N-methyl-2-pyrrolidone, but is not limited thereto.

The conductive material is used to impart conductivity to the positive electrode, and is not particularly limited as long as it is a conventional electrically conductive material that does not cause a chemical change in the secondary battery. As an example, the conductive material may be natural graphite, artificial graphite, carbon black, acetylene black, ketjen black, carbon fiber, carbon nanotube, and combinations thereof, but is not limited thereto.

The current collector may be stainless steel, aluminum, nickel, titanium, calcined carbon, or stainless steel whose surface is treated with carbon, nickel, titanium, silver, or the like, but is not limited thereto.

Then, the prepared high-viscosity slurry composition for a positive electrode is heated to the temperature lower than the boiling point ($T_b$) of the solvent.

Therefore, the high-viscosity slurry composition for a positive electrode is heated at the temperature lower than the boiling point, such that the viscosity of the slurry composition for a positive electrode may be decreased to a viscosity at which a work is easy and the positive electrode having a uniform thickness may be formed. Therefore, in the fabrication method of a positive electrode for a secondary battery according to the present invention, the high-viscosity slurry composition for a positive electrode containing the solid in a large amount is used, but the slurry composition for a positive electrode may be applied onto the current collector in a state in which the viscosity of the slurry composition for a positive electrode is decreased by heating the slurry composition for a positive electrode.

However, in a case where a heating temperature of the slurry composition for a positive electrode is higher than or equal to the boiling point of the solvent, when the heated slurry composition for a positive electrode is transferred and stored, a strong vapor pressure is generated in a pipe or a storage container for transferring the slurry composition, which may cause a risk such as slurry leakage or explosion.

Therefore, the heating may be performed at the temperature lower than the boiling point of the solvent contained in the slurry composition for a positive electrode.

Specifically, the heating temperature (T) may satisfy the following Relational Equation 1.

$$0.3T_b < T < 0.9T_b \qquad \text{[Relational Equation 1]}$$

In the above Relational Equation 1, $T_b$ is the boiling point of the solvent.

In Relational Equation 1, $0.35\ T_b < T < 0.9\ T_b$, preferably $0.4\ T_b < T < 0.85\ T_b$, and more preferably $0.5\ T_b < T < 0.8\ T_b$.

A viscosity ($A_2$) of the heated slurry composition may be 6,000 to 10,000 cP, preferably 7,000 to 9,800 cP, and more preferably 7,500 to 9,600 cP at a corresponding temperature of each slurry composition.

In step (b), the heated slurry composition for a positive electrode is applied onto the current collector. In this case, the applying may be performed without heating (raising a temperature of) the slurry composition and the substrate (current collector).

As a non-restrictive example, the applying may be performed using any applying method known to be used for forming a film by generally applying a liquid phase. For example, the applying may be performed using spray coating, dip coating, spin coating, gravure coating, slot die coating, doctor blade coating, roll coating, inkjet printing, flexography printing, screen printing, electrohydrodynamic inkjet printing, micro contact printing, imprinting, reverse offset printing, bar-coating, gravure offset printing, and the like, but is not limited thereto.

In step (c), the applied slurry composition for a positive electrode is cooled.

The cooling is performed at a temperature of 10 to 30° C., specifically 10 to 25° C., and more specifically 15 to 25° C., for 1 to 60 seconds, specifically 1 to 30 seconds, and more specifically 3 to 7 seconds, immediately after the slurry composition for a positive electrode is heated and applied onto the current collector.

The heated slurry composition for a positive electrode is cooled, such that the viscosity of the slurry composition for a positive electrode may be restored to a high viscosity again. Therefore, in the fabrication method of a positive electrode for a secondary battery according to the present invention, the high-viscosity slurry composition for a positive electrode containing the solid in the large amount is used, but the slurry composition for a positive electrode is applied onto the current collector in a state in which the viscosity of the slurry composition for a positive electrode is decreased by heating the slurry composition for a positive electrode, and the slurry composition for a positive electrode is cooled immediate after the slurry composition for a positive electrode is applied, such that the viscosity of the slurry composition for a positive electrode may be restored to the high viscosity again, and a migration phenomenon of the solid (the binder or the conductive material) occurring in a subsequent drying process may thus be suppressed. Therefore, the present invention may provide the positive electrode for a secondary battery having an improved adhesive force between the current collector and the positive electrode active material layer and prevent a problem such as a decrease in fluidity and non-uniformity of a thickness of the electrode that may be caused by the high viscosity.

A viscosity ($A_3$) of the cooled slurry composition may be 8,000 cP to 60,000 cP, preferably 10,000 cP to 55,000 cP, more preferably 13,000 cP to 50,000 cP, and even more preferably 35,000 cP to 45,000 cP at a corresponding temperature of each slurry composition.

That is, the slurry composition for a positive electrode may satisfy the following Relational Equations 2' and 3'.

$$A_2 < A_1 \qquad \text{[Relational Equation 2']}$$

$$A_2 < A_3 \qquad \text{[Relational Equation 3']}$$

In the above Relational Equations 2' and 3', $A_1$ is the viscosity of the slurry composition for a positive electrode before being heated, $A_2$ is the viscosity of the heated slurry composition for a positive electrode, and $A_3$ is the viscosity of the cooled applied film (slurry composition for a positive electrode).

However, even though the heated slurry composition for a positive electrode is cooled within a limited time, the heated slurry composition for a positive electrode may not be cooled to the temperature of the slurry composition for a positive electrode before being heated, and the viscosity of the slurry composition for a positive electrode restored by cooling the heated slurry composition for a positive electrode may thus be lower than that of the slurry composition for a positive electrode before being heated. Therefore, the above Relational Equations 2' and 3' may be organized as $A_2 < A_3 \leq A_1$, but are not limited thereto.

In an embodiment, the viscosity of the slurry composition for a positive electrode is decreased to ⅓ or less after the slurry composition for a positive electrode is heated, and may be restored to a viscosity similar to an original viscosity again when the heated slurry composition for a positive electrode is cooled.

That is, the above Relational Equations 2' and 3' may be organized again as the following Relational Equations 2 and 3.

$$1.3 \leq A_1/A_2 \leq 12 \qquad \text{[Relational Equation 2]}$$

In the above Relational Equation 2, $1.8 \leq A_1/A_2 \leq 11$, specifically $3 \leq A_1/A_2 \leq 10$, and more specifically, $6 \leq A_1/A_2 < 7$.

$$1.1 \leq A_3/A_2 \leq 10 \qquad \text{[Relational Equation 3]}$$

In the above Relational Equation 3, $1.3 \leq A_3/A_2 \leq 9$, specifically $3 \leq A_3/A_2 \leq 7$, and more specifically, $4 \leq A_3/A_2 \leq 5$.

In addition, the fabrication method of a positive electrode for a secondary battery according to the present invention may further include (d) drying the cooled slurry composition for a positive electrode. In this case, the drying may be performed at a temperature of 100° C. or more and less than 180° C., preferably 110 to 145° C., more preferably at 110 to 135° C., and more specifically 110 to 125° C., for 20 to 150 seconds, preferably 50 to 130 seconds, more preferably 70 to 120 seconds, and most preferably 90 to 110 seconds.

Another embodiment of the present invention provides a positive electrode for a secondary battery fabricated according to the fabrication method described above and including: a current collector; and a positive electrode active material layer formed on the current collector and containing a positive electrode active material, a conductive material, and a binder.

In general, in a case where the slurry composition for a positive electrode is simply heated to decrease the viscosity of the slurry composition for a positive electrode, is applied onto the current collector, and is then dried as it is in a high viscosity state, the conductive material and the binder light due to a particle size relatively smaller than that of the positive electrode active material may easily migrate toward a surface of a slurry layer for a positive electrode by a flow of the solvent. In this case, an adhesive force of the positive electrode active material layer to the substrate (current collector) may be significantly decreased.

However, the positive electrode for a secondary battery fabricated according to the present invention is fabricated by applying the slurry composition for a positive electrode onto the current collector in a state in which the viscosity of the slurry composition for a positive electrode is decreased by heating the high-viscosity slurry composition for a positive electrode, cooling the applied slurry composition for a positive electrode immediately after the slurry composition for a positive electrode is applied to restore the viscosity of the slurry composition for a positive electrode to the high viscosity again, and then drying the cooled slurry composition for a positive electrode, and a migration phenomenon of the solid (the binder or the conductive material) may thus be suppressed.

Therefore, the binder and the conductive material may not have a concentration gradient in a thickness direction of the positive electrode active material layer. In detail, in a case where the positive electrode active material layer is divided into a first region adjacent to the current collector, a second region positioned at a central portion of the positive electrode active material layer, and a third region adjacent to a surface of the positive electrode active material layer and is divided so that the respective regions have the same thickness, a concentration deviation of contents of the solids (the binders or the conductive materials) contained in the respective regions may be 0.4 wt % or less, specifically 0.01 to 0.4 wt %, and more specifically 0.05 to 0.35 wt %.

Meanwhile, the first region, the second region, and the third region may have the same thickness, but the present invention is not limited thereto.

In addition, the present invention is to solve a problem such as a decrease in fluidity of a slurry and non-uniformity of a thickness of the positive electrode that may be caused by using a high-viscosity slurry, and may improve fluidity of a slurry in spite of using a high-viscosity slurry for a positive electrode as compared with the related art to form the positive electrode at a uniform thickness (uniformly load the slurry) at the time of applying the slurry.

In the positive electrode according to an embodiment of the present invention, the positive electrode active material layer may be uniformly formed in a length direction (width direction), and specifically, a loading level of the positive electrode active material layer may be uniform.

Specifically, in the positive electrode, a difference between a maximum loading value and a minimum loading value of the positive electrode active material layer at five or more positions having regular intervals in the length direction may be 10% or less, for example, 9% or less, 8% or less, or 6% or less, of a total loading average value. Accordingly, the above-described effect may be further improved.

In this case, the loading may refer to a weight of a solid in a positive electrode active material slurry or a weight of a positive electrode active material layer of a positive electrode finally formed after a positive electrode slurry applied onto a positive electrode current collector is dried, and as a non-restrictive example, after a specimen is obtained by punching at least five points having regular intervals in a length direction (width direction) of the positive electrode in a circular shape, the weight of the solid in the positive electrode active material slurry or the positive electrode active material layer in the specimen may be measured.

Therefore, the positive electrode for a secondary battery fabricated according to the present invention may have an improved adhesive force to the substrate (current collector) due to the solid uniformly dispersed in the positive electrode active material layer.

In a preferred embodiment, an adhesive force of the positive electrode active material layer to the current collector may be 0.35 N/cm or more, specifically 0.35 to 1.5 N/cm, and more specifically 0.45 to 0.8 N/cm.

In addition, the present invention provides a secondary battery including: the positive electrode; a negative electrode; a separator positioned between the positive electrode and the negative electrode; and an electrolyte.

In detail, the positive electrode fabricated according to the present invention may have an improved adhesive force to a substrate and uniformity of a thickness. Therefore, the secondary battery including the positive electrode may have further improved long-term stability.

The negative electrode may include a current collector and a negative electrode active material layer disposed on the current collector. A material of the current collector may be copper or nickel, but is not limited thereto.

A negative electrode active material may be used without limitation as long as it is a negative electrode active material usually used for the secondary battery. For example, the negative electrode active material may be a carbon-based negative electrode active material, a silicon-based negative electrode active material, or a mixture thereof, but is not limited thereto. The carbon-based negative electrode active material may be one or more selected among artificial graphite, natural graphite, and hard carbon. The silicon-based negative electrode active material may be Si, SiOx (0<x<2), a Si-Q alloy (here, Q is an element selected from the group consisting of alkali metals, alkaline earth metals, Group XIII elements, Group XIV elements, Group XV elements, Group XVI elements, transition metals, rare earth elements, and combinations thereof and is not Si), a Si-carbon composite, or a mixture of at least one of them and $SiO_2$.

The separator is not particularly limited as long as it is a separator known in the art. For example, the separator may be selected among glass fiber, polyester, polyethylene, polypropylene, polytetrafluoroethylene, or a combination thereof, may be in the form of a non-woven fabric or a woven fabric, and may optionally be used in a single-layer or multi-layer structure.

The electrolyte includes a non-aqueous organic solvent and an electrolytic salt. The non-aqueous organic solvent may be ethylene carbonate (EC), propylene carbonate (PC), dimethyl carbonate (DMC), diethyl carbonate (DEC), ethylmethyl carbonate (EMC), 1,2-dimethoxyethane (DME), γ-butyrolactone (BL), tetrahydrofuran (THF), 1,3-dioxolane (DOL), diethyl ester (DEE), methyl formate (MF), methyl propionate (MP), sulfolane (S), dimethyl sulfoxide (DMSO), acetonitrile (AN), or a mixture thereof, but is not limited thereto. The electrolytic salt is a material dissolved in the non-aqueous organic solvent, acting as a supply source of electrolytic metal ions in the secondary battery to enable a basic operation of the secondary battery, and promoting movement of the electrolytic metal ions between the positive electrode and the negative electrode. As a non-restrictive example, in a case where an electrolytic metal is lithium, the electrolytic salt may be $LiPF_6$, $LiBF_4$, LiTFSI, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (here, x and y are natural numbers), LiCl, LiI, or a mixture thereof, but is not limited thereto. In addition, the electrolyte salt may be a known material used in a concentration suitable for the purpose, and may further, if necessary, include a known solvent or additive in order to improve charging/discharging characteristics, flame-retardant characteristics, and the like.

EXAMPLE

Example 1

Step 1: Preparation of Positive Electrode Slurry 79.5 wt % of nickel cobalt manganese oxide (NCM) (specifically CSG131, Ni:Co:Mn=8:1:1), 1.2 wt % of polyvinylidene fluoride, 0.8 wt % of carbon black, and 18.5 w % of N-methyl pyrrolidone (NMP) were mixed with each other to prepare a positive electrode slurry (81.5 wt % of solid based on a total slurry), and the prepared positive electrode slurry was stirred in a stirring tank heated to 80° C. for 30 minutes to maintain a temperature of the positive electrode slurry at 80° C.

Step 2: Fabrication of Positive Electrode

The positive electrode slurry (in a state in which it is heated to 80° C.) prepared in Step 1 was applied onto an aluminum current collector (an aluminum foil having a thickness of 12 μm) using a slot die coater.

Then, the applied positive electrode slurry was left at 25° C. for 5 seconds, cooled to 50° C., and dried in a drying furnace heated with hot air of 140° C. for 1 minute to complete a positive electrode active material layer.

In this case, a thickness of the positive electrode active material layer was set to 50 um.

EVALUATION EXAMPLE

[Evaluation Example 1]: Measurement of Image of Cross Section of Positive Electrode Active Material Layer Captured by SEM and Evaluation of Adhesive Force Between Active Material Layer and Current Collector

Comparative Example 1

A positive electrode was fabricated in the same manner as in Example 1 except that drying was performed immediately after the heated positive electrode slurry was applied without performing a process of cooling the applied positive electrode slurry in Step 2 of Example 1.

Comparative Example 2

The same method as in Example 1 was used except that the applied positive electrode slurry was dried and used as it is without performing a process of heating and cooling the positive electrode slurry in Step 2 of Example 1.

(Evaluation Method)

* Measurement of Image of Cross Section of Positive Electrode Active Material Layer Captured by SEM-EDS Cross sections of positive electrodes prepared according to Example 1 and Comparative Example 1 were cut with an ion-milling device and fluorine distributions of binders in the positive electrodes were then measured through a scanning electron microscope-energy dispersive X-ray spectroscopy (SEM-EDS), and measurement results were compared and illustrated in FIG. 1.

* Evaluation of Homogeneity of Positive Electrode Active Material Layer

Figure 2:
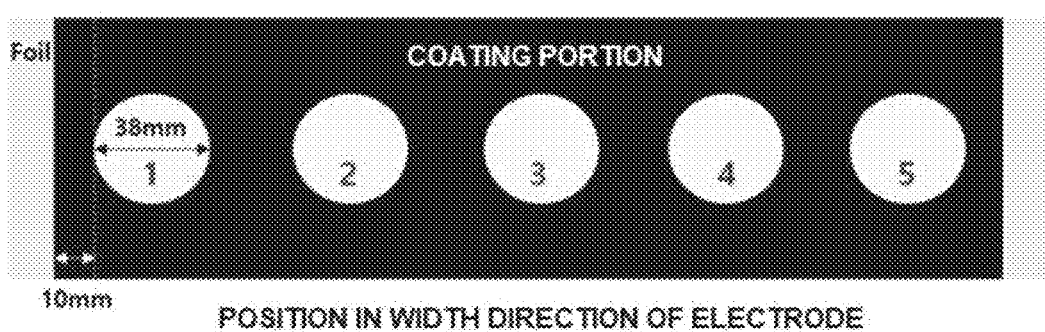
FIG. 2 is a schematic diagram of a specimen obtained by selecting five points having regular intervals in a width direction of the positive electrode active material layer and punching the selected five points in a circular shape having a diameter of 38 mm in order to evaluate homogeneity of the positive electrode active material layer.

In order to analyze homogeneity of the positive electrode active material layers fabricated in Example 1 and Comparative Example 1, as illustrated in FIG. 2, five points having regular intervals in a length direction of the positive electrode active material layers were selected and punched in a circular shape having a diameter of 38 mm, and weights of the positive electrode active material layers in punched specimens were then measured to analyze loading levels of the positive electrode active material layers in the positive electrodes. The weights of the positive electrode active material layers (loading levels of positive electrode active material layer compositions) measured for each position were divided by total weights of the positive electrode active material layers to be normalized, and results of the normalization are illustrated in FIG. 3.

Figure 3:
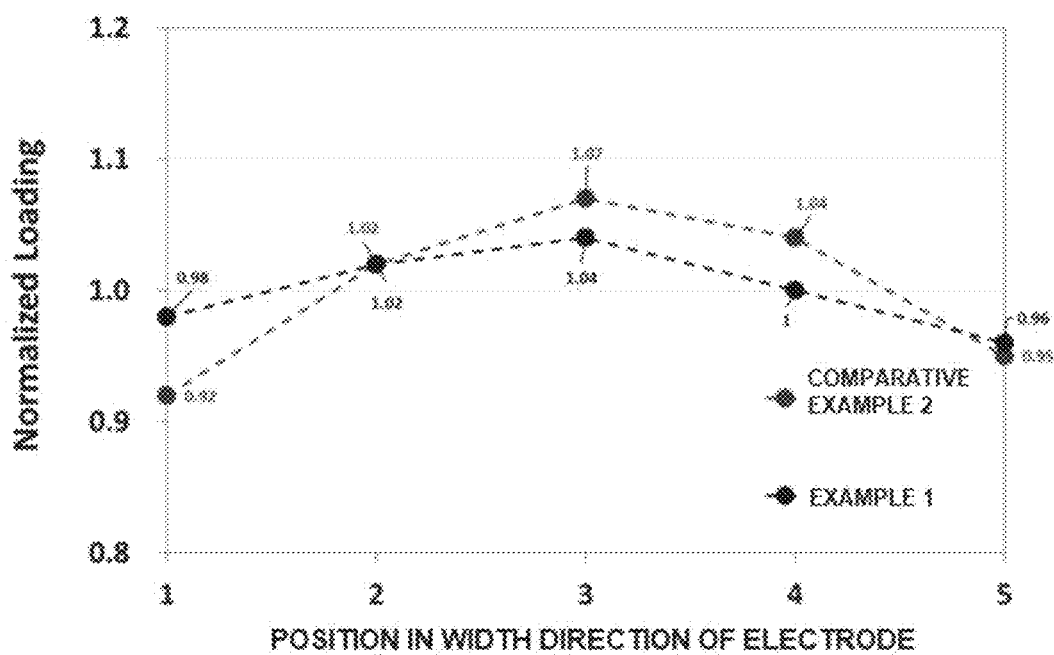
FIG. 3 is graphs illustrating results obtained by dividing weights of positive electrode active material layers (loading levels of positive electrode active material layer compositions) measured for each position of positive electrodes according to Example 1 and Comparative Example 2 according to a width direction by total weights of the positive electrode active material layers to normalize the weights.

As illustrated in FIG. 3, it can be seen that when the positive electrode active material layer is fabricated, in a case where the positive electrode slurry is applied in a state in which a viscosity of the positive electrode slurry is decreased to about 9,500 cp by heating the positive electrode slurry (Example 1), a difference between loading values (maximum value–minimum value) of the positive electrode active material layer was 6%, which is very low, of a total loading average value measured at five points, while in a case where the positive electrode slurry is applied in a state in which it has a high viscosity of 64,000 cp (Comparative Example 2), a difference between loading values of the positive electrode active material layer was 15% of a total loading average value measured at five points, which shows a non-uniform distribution in which a loading level of a central portion is high and a loading level of an outer side portion is low.

* Measurement of Viscosity of Positive Electrode Active Material Slurry

Each viscosity of the slurry composition for a positive electrode before and after being heated and after being cooled was measured at a shear rate of 5 $s^{-1}$ at a corresponding temperature of each slurry composition using a rotary viscometer after preparing slurry compositions for a positive electrode at corresponding temperatures.

* Evaluation of Interfacial Adhesive Force Between Active Material Layer and Current Collector The positive electrodes prepared in Example 1 and Comparative Example 1 were cut at a width of 18 mm and a length of 150 mm, and tapes having a width of 18 mm were attached to foil layers of the positive electrodes and then allowed to be sufficiently adhered to the foil layers with a roller having a load of 2 kg. The active material layers of the positive electrodes were attached to one side of a tensile tester using a double-sided tape. The tapes attached to the foil layers were fastened to the other side of the tensile tester, measurement of adhesive forces was performed, and measurement results are illustrated in Table 1.

TABLE 1

| | Viscosity (cP) of positive electrode slurry | | | Adhesive force (N/cm) |
|---|---|---|---|---|
| | Before being heated (@ 25° C.) | After being heated (@ 80° C.) | After being cooled (@ 50° C.) | |
| Example 1 | 64,000 | 9,500 | 42,000 | 0.52 |
| Comparative Example 1 | 64,000 | 9,500 | — | 0.39 |
| Comparative Example 2 | 64,000 | — | — | — |

Referring to Table 1, when looking at a change in a viscosity of the slurry composition for a positive electrode according to a temperature, it can be seen that the viscosity of the slurry composition for a positive electrode was decreased immediately after the slurry composition was heated and then restored to a high viscosity after the slurry composition was cooled.

It can be seen that even though the positive electrode according to Example 1 was fabricated using the slurry composition for a positive electrode having the highest viscosity by containing a solid in a large amount (81.5 wt %), the positive electrode according to Example 1 had a high adhesive force to a substrate. It can be seen that the electrode according to Comparative Example 1 used a slurry composition for a positive electrode containing a solid content in the same large amount (81.5 wt %) as in Example 1, but was fabricated by drying a slurry composition for a positive electrode heated to have a decreased viscosity as it is immediately after the slurry composition for a positive electrode is applied without performing a cooling process unlike Embodiment 1, and thus had an adhesive force to a substrate lower than that in Example 1. This is because a binder concentration was increased in a region adjacent to a surface of a positive electrode active material layer as compared with a region adjacent to the substrate owing to migration of a binder and a conductive material to an electrode surface layer due to a flow of a solvent in a case where the slurry composition for a positive electrode is dried as it is in a low-viscosity state.

Meanwhile, the slurry according to Comparative Example 2 contained a solid in the same amount as in Example 1 to have a high viscosity, but a process of decreasing a viscosity of the slurry by heating the slurry is not performed, such that the viscosity of the slurry is too high to fabricate a positive electrode. Therefore, an adhesive force to a substrate in Comparative Example 2 might not be evaluated.

In addition, referring to FIG. 1, it could be confirmed that the concentration gradient of the binder and the conductive material in the thickness direction of the positive electrode active material layer of Example 1 did not substantially appear. It is analyzed that this is due to suppression of a migration phenomenon of the binder and the conductive material occurring in a slurry drying process. On the other hand, in Comparative Example 1, the slurry was dried immediately in a low-viscosity state, such that concentrations of the binder and the conductive material were increased in the region adjacent to the surface of the positive electrode active material layer as compared with the region adjacent to the substrate.

[Evaluation Example 2]: Evaluation of Adhesive Force Between Active Material Layer and Current Collector According to Change in Content of Solid of Positive Electrode Active Material Slurry Examples 2 to 4 and Comparative Example 3

Positive electrodes were fabricated in the same manner as in Example 1 except that the viscosity of the positive electrode slurry was changed as described in Table 2 by changing a content of the solid in the positive electrode slurry and a heating temperature of the positive electrode slurry at the time of preparing of the positive electrode slurry, in Step 1 of Example 1. In this case, the heating temperatures of Examples 2 to 4 were adjusted so that the viscosities of each slurry were 7,800 to 8,700 cP, and in Comparative Example 3, a slurry at room temperature (25° C.) on which heating is not performed was used.

(Evaluation Method)

Evaluation of interfacial adhesive forces between the active material layers and the current collectors and evaluation of viscosities were performed in the same manner as in Evaluation Example 1, and evaluations results were illustrated in Table 2.

TABLE 21

| Division | (Content (%) of solid | Viscosity (cP) of positive electrode slurry | | | Viscosity ratio ($A_1/A_2$) | Viscosity ratio ($A_3/A_2$) | Adhesive force (N/cm) |
| --- | --- | --- | --- | --- | --- | --- | --- |
| | | $A_1$ before being heated | $A_2$ after being heated | $A_3$ after being cooled | | | |
| Example 1 | 81.5 | 64,000 | 9,500 | 42,000 | 6.7 | 4.4 | 0.52 |
| Example 2 | 80.0 | 53,000 | 7,800 | 37,000 | 6.8 | 4.7 | 0.48 |
| Example 3 | 76.0 | 13,000 | 8,700 | 9,800 | 1.5 | 1.1 | 0.35 |
| Example 4 | 78.0 | 18,000 | 8,500 | 12,000 | 2.1 | 1.4 | 0.36 |
| Comparative Example 3 | 74.0 | 2,600 | 2,600 | 2,600 | 1.0 | 1.0 | 0.32 |

Referring to Table 2, it could be seen that in a case of Examples 1 and 2 having a preferable content range of solid, fluidity of a solvent was decreased due to a high viscosity of the applied slurry, such that a migration phenomenon of the binder in a drying process is suppressed, and as a result, an adhesive force between the substrate and the active material layer was increased.

On the other hand, it could be confirmed that in Comparative Example 3, an adhesive force was very low, and it was analyzed that the positive electrode was formed using a slurry at room temperature that is not subjected to a heating step, a content of the solid in the slurry was not sufficiently high, such that the slurry contained a solvent in a relatively large amount, and a concentration gradient in which a content of the binder is higher in a surface of the positive electrode due to a migration phenomenon of the binder under the same drying condition was formed.

Meanwhile, it could be confirmed that Embodiments 3 and 4 showed a tendency to have adhesive forces somewhat lower than those of Examples 1 and 2 due to a relatively small content of a solid in the slurry, and a content of the solid in the slurry composition for a positive electrode was more than 74 parts by weight and 90 parts by weight or less based on 100 parts by weight of the slurry composition for a positive electrode.

[Evaluation Example 3]: Evaluation of Adhesive Force Between Active Material Layer and Current Collector According to Change in Drying Condition of Positive Electrode Active Material Slurry Examples 5 to 8

Positive electrodes were fabricated in the same manner as in Example 1 except that the drying process of the applied positive electrode slurry was changed as described in Table 3, in Step 2 of Example 1.

Comparative Example 4

A positive electrode was fabricated in the same manner as in Comparative Example 3 except that the drying process of Comparative Example 3 was changed as described in Table 3.

(Evaluation Method)

Evaluation of interfacial adhesive forces between the active material layers and the current collectors was performed in the same manner as in Evaluation Example 1, and evaluations results were illustrated in Table 3.

TABLE 3

| Division | (Content (%) of solid | Drying condition Drying temperature (° C.) | Drying time (second) | Adhesive force (N) |
|---|---|---|---|---|
| Example 1 | 81.5 | 140 | 60 | 0.52 |
| Example 5 | 81.5 | 130 | 80 | 0.54 |
| Example 6 | 81.5 | 120 | 100 | 0.55 |
| Example 7 | 81.5 | 150 | 45 | 0.48 |
| Example 8 | 81.5 | 160 | 30 | 0.46 |
| Comparative Example 4 | 74 | 120 | 100 | 0.32 |

Referring to Table 3, it can be confirmed that in a case where a drying temperature is a low temperature of 140° C. or less (Examples 1, 5, and 6), a drying time is increased in order to evaporate the solvent, but a migration phenomenon of the binder is suppressed, such that an adhesive force between the substrate and the active material layer is increased. On the other hand, it can be confirmed that in a case where a drying temperature is excessively high (Examples 7 and 8), active material particles are easily exposed to a surface of the solvent in the drying process due to rapid drying, and as a result, a migration phenomenon due to a capillary phenomenon is intensified, such that an adhesive force between the substrate and the active material layer is decreased. In addition, it can be confirmed that in a case of a conventional positive electrode slurry in which a content of a solid is 74 wt % (Comparative Example 4), an adhesive force between the substrate and the active material layer is the lowest in spite of performing the same drying process as in Example 6, which is a condition in which the adhesive strength is the most excellent.

In the fabrication method of a positive electrode for a secondary battery according to the present invention, in order to solve a problem of a conventional fabrication method of a positive electrode using a low-viscosity slurry composition for a positive electrode, that is, a problem that the adhesive force between the current collector and the positive electrode active material layer is decreased due to migration of the conductive material and the binder to the surface of the positive electrode active material layer owing to a flow of a low-viscosity solvent at the time of drying the slurry composition, the high-viscosity slurry composition for a positive electrode is used, but the positive electrode is fabricated through a process of applying the high-viscosity slurry composition for a positive electrode onto the current collector in a state in which the viscosity of the high-viscosity slurry composition for a positive electrode is decreased by heating the high-viscosity slurry composition for a positive electrode, cooling the applied slurry composition for a positive electrode at room temperature again, and then drying the cooled slurry composition for a positive electrode. Therefore, it is possible to prevent a problem such as the decrease in fluidity and the non-uniformity of the thickness of the positive electrode that may be caused by the high viscosity while providing the positive electrode for a secondary battery having an improved adhesive force between the current collector and the positive electrode active material layer.

The present invention has been described hereinabove, but the present invention is not limited to the above embodiments, but may be implemented in various different forms, and those skilled in the art to which the present invention pertains may understand that the present invention may be implemented in other specific forms without changing the technical spirit or essential features of the present invention. Therefore, it is to be understood that the embodiments described above are illustrative rather than being restrictive in all aspects.

What is claimed is:

1. A fabrication method of a positive electrode for a secondary battery, comprising:
   (a) heating a slurry composition containing a positive electrode active material, a binder, and a solvent to a temperature lower than a boiling point ($T_b$) of the solvent;
   (b) applying the heated slurry composition onto a current collector;
   (c) cooling the applied slurry composition; and
   (d) drying the cooled slurry composition,
   wherein the cooling is performed immediately after the applying and at a temperature of 10 to 30° C., and
   wherein the drying is performed at a temperature of 100° C. or more and less than 180° C.

2. The fabrication method of a positive electrode for a secondary battery of claim 1, wherein a solid in the slurry composition for a positive electrode is contained in an amount of more than 74 parts by weight and 90 parts by weight or less based on 100 parts by weight of the slurry composition for a positive electrode.

3. The fabrication method of a positive electrode for a secondary battery of claim 1, wherein a viscosity ($A_1$) of the slurry composition for a positive electrode before being heated is 13,000 to 80,000 cP.

4. The fabrication method of a positive electrode for a secondary battery of claim 1, wherein a temperature (T) of the heating of the slurry composition for a positive electrode satisfies the following Relational Equation 1:

$$0.3T_b < T < 0.9T_b \qquad \text{[Relational Equation 1]}$$

wherein $T_b$ is the boiling point of the solvent.

5. The fabrication method of a positive electrode for a secondary battery of claim 1, wherein the cooling is performed for 1 to 60 seconds.

6. The fabrication method of a positive electrode for a secondary battery of claim 1, wherein the slurry composition for a positive electrode satisfies the following Relational Equations 2 and 3:

$$1.3 \leq A_1/A_2 \leq 12 \qquad \text{[Relational Equation 2]}$$

$$1.1 \leq A_3/A_2 \leq 10 \qquad \text{[Relational Equation 3]}$$

wherein $A_1$ is a viscosity of the slurry composition before being heated, $A_2$ is a viscosity of the heated slurry composition for a positive electrode, and $A_3$ is a viscosity of the cooled slurry composition for a positive electrode.

7. The fabrication method of a positive electrode for a secondary battery of claim 1, wherein the drying is performed at a temperature of 110° C. or more and less than 145° C. for 20 to 150 seconds.

\* \* \* \* \*